(12) United States Patent
Meulemans et al.

(10) Patent No.: US 6,736,430 B1
(45) Date of Patent: May 18, 2004

(54) METHOD OF SEALING A JOINT BETWEEN TWO PIPES

(75) Inventors: Dirk Meulemans, Lubbeek (BE); Paul Peigneur, Sint-Truiden (BE)

(73) Assignee: Tyco Electronics Raychem NV, Kessel-Lo (BE)

( * ) Notice: Subject to any disclaimer, the term of this patent is extended or adjusted under 35 U.S.C. 154(b) by 0 days.

(21) Appl. No.: 09/914,742

(22) PCT Filed: Mar. 3, 2000

(86) PCT No.: PCT/GB00/00810

§ 371 (c)(1),
(2), (4) Date: Oct. 31, 2001

(87) PCT Pub. No.: WO00/52381

PCT Pub. Date: Sep. 8, 2000

(30) Foreign Application Priority Data

Mar. 5, 1999 (GB) ............................................. 9905037

(51) Int. Cl.⁷ ............................................... F16L 11/12
(52) U.S. Cl. ...................... 285/47; 285/915; 285/381.1; 156/308.4
(58) Field of Search .............................. 285/47, 294.3, 285/915, 381.1, 21.3; 156/308.4

(56) References Cited

U.S. PATENT DOCUMENTS

| 3,297,819 | A | * | 1/1967 | Wetmore ..................... 174/127 |
| 3,415,287 | A | * | 12/1968 | Heslop et al. ............... 138/141 |
| 3,677,303 | A | * | 7/1972 | Martin ......................... 285/47 |
| 3,744,823 | A | * | 7/1973 | Muir et al. .................... 285/47 |
| 3,807,458 | A | * | 4/1974 | Royston ....................... 138/141 |
| 4,084,842 | A | * | 4/1978 | Stonitsch et al. ............. 285/47 |
| 4,144,404 | A | * | 3/1979 | De Groef et al. .......... 174/88 C |
| 4,465,309 | A | * | 8/1984 | Nimke et al. ................. 285/373 |
| 4,509,561 | A | * | 4/1985 | Litz ............................. 138/149 |
| 4,610,740 | A | * | 9/1986 | Nordstrom .................... 156/79 |
| 4,728,550 | A | | 3/1988 | Beersel et al. ................. 428/36 |
| 4,732,412 | A | * | 3/1988 | van der Linden et al. .... 285/47 |
| 5,489,405 | A | | 2/1996 | Holbert et al. ................ 264/35 |
| 6,402,201 | B1 | * | 6/2002 | Pool et al. ..................... 285/47 |

FOREIGN PATENT DOCUMENTS

| EP | 0 195 683 | 9/1986 | ........... F16L/59/16 |
| FR | 2 721 681 | 12/1995 | ........... F16L/13/00 |
| GB | 2 108 625 | 5/1983 | ........... F16L/55/18 |

OTHER PUBLICATIONS

T. T. K. Jin et al., "Subsea Malaysian Waxy Crude Line Uses Single–Pipe Insulation Coating", Oil and Gas Journal, vol. 93, No. 39, Penwell Publishing Co., Tulsa, Oklahoma, Sep. 25, 1995, p. 84–90.

* cited by examiner

Primary Examiner—David Bochna
(74) Attorney, Agent, or Firm—Anthony William Jay; Lawrence A. Chaletsky; Elizabeth A. O'Brien

(57) ABSTRACT

The present invention provides a joint (6) between insulated pipes (4), which comprises: (a) two transport pipes joined together; (b) insulation on each transport pipe which ends short of the joint; (c) a casing surrounding the exposed portion of pipe; (d) a sleeve which provides a seal between an end of the casing and the adjacent pipe insulation, wherein the sleeve comprises recoverable polymeric material (1) coated at discrete regions with a sealant (3) and/or a heat-activatable adhesive (2), (preferably with the sealant (3) bridging the end of the casing and the pipe insulation to form a seal therebetween which can accommodate movement of the casing relative to the pipe insulation, and the adhesive (2) forming substantially annular bonds between the sleeve and the casing and between the sleeve and pipe insulation), characterised in that at least one region (4) of the sleeve, preferably between the sealant-coated and the adhesive-coated regions or at the edge of the sleeve, remains uncoated to provide a relatively high-friction slip-resisting grip when the sleeve is being recovered in use.

24 Claims, 3 Drawing Sheets

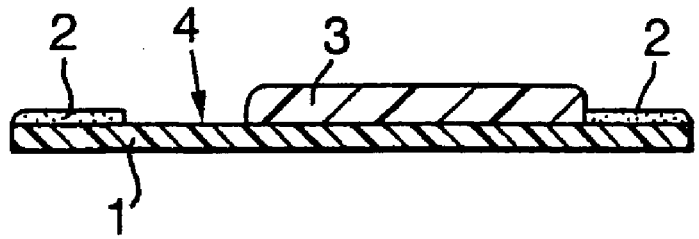
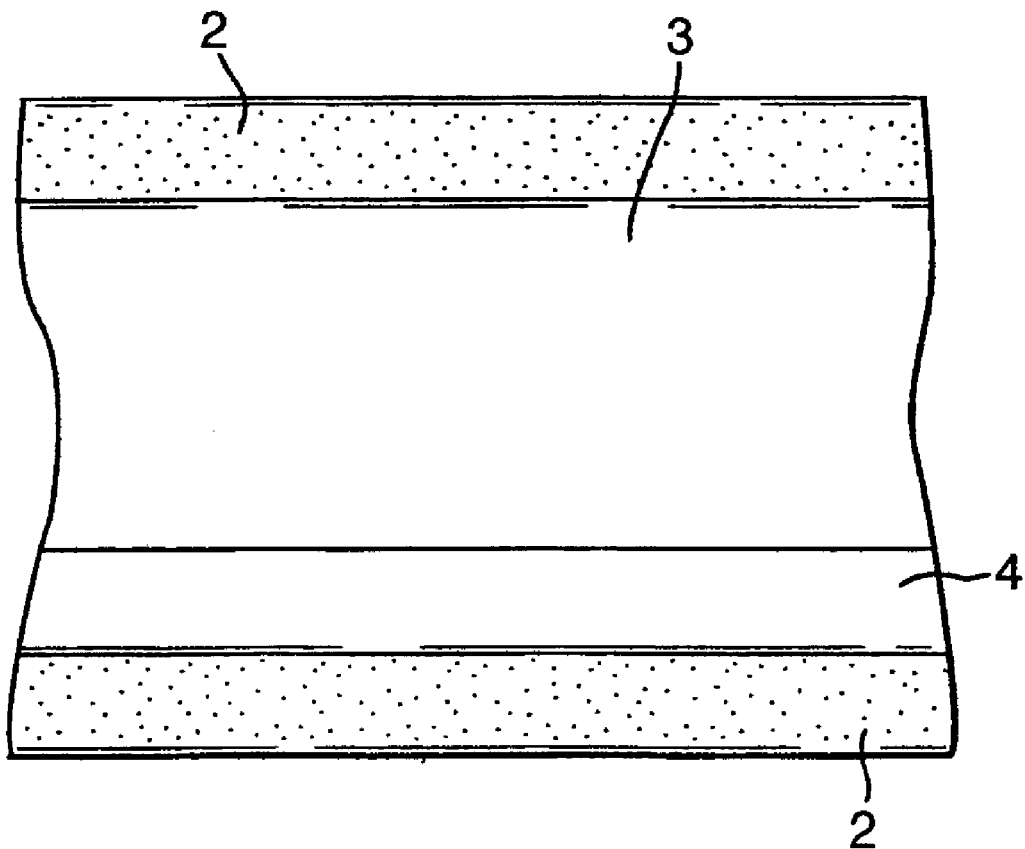

METHOD OF SEALING A JOINT BETWEEN TWO PIPES

FIELD OF THE INVENTION

The present invention relates to coated recoverable articles for use in protecting insulated pipes from corrosive or other damage or from heat loss, and in particular for sealing joints in district heating pipes against water ingress. Such articles and methods, and assemblies using them are described in EP-B-0079702 (B073), the disclosure of which is incorporated herein by reference.

DETAILED DESCRIPTION OF THE INVENTION

The present invention provides a joint between insulated pipes, which comprises:

(a) two transport pipes joined together;

(b) insulation on each transport pipe which ends short of the joint;

(c) a casing surrounding the exposed portion of pipe;

(d) a sleeve which provides a seal between an end of the casing and the adjacent pipe insulation, wherein the sleeve comprises recoverable polymeric material coated at discrete regions with a sealant and/or a heat-activatable adhesive, (preferably with the sealant bridging the end of the casing and the pipe insulation to form a seal therebetween which can accommodate movement of the casing relative to the pipe insulation, and the adhesive forming substantially annular bonds between the sleeve and the casing and between the sleeve and pipe insulation), characterised in that at least one region (4) of the sleeve, preferably between the sealant-coated and the adhesive-coated regions or at the edge of the sleeve, remains uncoated to provide a relatively high-friction slip-resisting grip when the sleeve is being recovered in use.

The sealant (or the adhesive) constituting a region of a principal surface of the sleeve is an outwardly facing layer at that region rather than some intermediate layer of a multi-layer laminate, although the sealant may be covered, by, for example, a release layer which has no function in the installed product. Where the sleeve is used to protect the outside of the pipe, the sealant and adhesive will of course be on the internal surface of the sleeve.

In a preferred embodiment, the present invention provides an assembly for use in the sealing of a cavity around an uninsulated portion of an insulated pipe, which comprises:

(a) a casing arranged substantially to surround the uninsulated portion of the pipe; and (b) a sleeve comprising a recoverable polymeric sheet, wherein the sleeve has a layer of a heat-activatable adhesive at a first region of a principle surface thereof, the layer of adhesive being arranged so as, in use, to provide a substantially annular bond between the polymeric sheet and the insulation of the pipe, which can resist movement of the sheet relative to the insulation; and/or a layer of a sealant at a second region of the said principle surface, the layer of sealant being arranged, in use, to overlap the casing and the pipe insulation, so as to provide a flexible seal between the casing and the insulation which can accommodate relative movement between the casing and the insulation, characterised in that at least one region (4) of the sleeve, preferably between the sealant-coated and the adhesive-coated regions or at the edge of the sleeve, remains uncoated to provide a relatively high-friction slip-resisting grip when the sleeve is being recovered in use.

The invention also provides a method of sealing a joint between two insulated pipes, the insulation of each of which ends short of the joint, which comprises:

(a) surrounding the exposed portion of pipe with a casing;

(b) joining an end of the casing to the adjacent pipe insulation by installing around the end of the casing a sleeve comprising a recoverably polymeric material coated with a sealant and/or a heat-activatable adhesive, (preferably with the sealant being positioned to overlap the end of the casing around substantially its entire periphery, and the heat-activatable adhesive being positioned to form substantially annular bonds between the sleeve and the casing and between the sleeve and the pipe insulation); and (c) causing the polymeric material to recover, the sealant (if present) to soften and the heat activatable adhesive (if present) to be activated, characterised in that at least one region (4) of the sleeve, preferably between the sealant-coated and the adhesive-coated regions or at the edge of the sleeve remains uncoated to provide a relatively high-friction slip-resisting grip when the sleeve is being recovered in use.

The recoverable polymeric sheet material is preferably heat recoverable, and heating will cause the sheet to recover, the sealant to soften and the heat-activatable adhesive to melt or otherwise to become activated and bond to the pipe insulation or to the casing. The size and shape of the region of hot-melt or other heat-activatable adhesive is not critical, but the uncoated slip-resisting region will generally be such as to prevent slipping of the sleeve or prevent the ends of the sleeve parting company from the pipe. We have found that an annular bond will give the desired benefits, but this is not to be construed as limited to a complete closed ring of bonding around the pipe. In some circumstances it will be sufficient to provide spots or patches of heat-activatable adhesive arranged around the circumference of the pipe such that the envelope of such spots or patches is generally annular in shape. Although one region of heat-activatable adhesive can be sufficient we prefer that two be provided, one at each end portion of the sleeve. The sleeve will then have a middle region of sealant, which can overlap the casing and the pipe insulation, and two end regions of heat-activatable adhesive which can bond to the pipe insulation and to the casing respectively and which are each separated from the sealant region by a said uncoated-region. In less preferred forms of the invention, the uncoated region(s) could possibly, if desired, be at the outer edge of the sleeve instead of between the adhesive sealant regions. The usual coating equipment can readily be adjusted to provide the uncoated region in the desired position on the sleeve.

The precise construction of the sleeve will depend on the specific application, and the variables to be considered include the following; width of sleeve, shrink ratio of sleeve, size, shape and number of regions of heat-activatable adhesive, thickness of sealant and thickness of adhesive, and the nature of the sealant and of the adhesive. The sleeve will conveniently be produced and supplied in long spooled lengths so that a suitable length can be cut-off, depending on the diameter of pipe to be protected.

The nature of the sealant and adhesive will first be considered. Where the recoverable material is heat recoverable it is preferred that the recovery temperature of the material, the softening temperature of the sealant and the activation temperature of the adhesive be compatible. The sleeve can be coated with a temperature indicating composition to give the worker an indication when sufficient heat has been applied. For examples of suitable compositions see our UK patent specifications 2038478 and 2077919. Typical installation temperatures are from 90–150° C., preferably 110–135° C. and a typical range of safe operating temperature of the installed sleeve is from −30° to 70° C. The adhesive of the sleeve (and of a closure patch where used) is preferably a hot-melt adhesive, and many types can be used, see for example U.S. Pat. Nos. 4,181,775 and 4,018,733 which disclose formulations comprising polyamides modified with hydrocarbon waxes, and mixtures of acidic ethylene polymers polyamides and tackifiers. Also suitable are EVA compositions including hydrocarbon waxes and optionally butyl rubber. A particularly preferred adhesive, especially for use on untreated substrates and where excellent low temperature performance is required, is that disclosed in UK patent publication 2075991, incorporated herein by reference. This publication discloses a hot-melt adhesive composition by comprising a polyamide and up to 10% by weight, preferably up to 5%, more preferably from 0.25–0.75% of an acrylic rubber. The composition preferably includes and ethylene/acrylic terpolymer, the preferred amount of which is from 10–20% based on the weight of polyamide. The terpolymer may comprise for example ethylene, an ethylenically unsaturated mono- or di-carboxylic acid, and a vinyl ester of a $C_1$–$C_6$ straight or branched chain aliphatic carboxylic acid. The combination ethylene/acrylic acid/butyl acrylate is preferred. Instead of the terpolymer, the composition may include a copolymer of ethylene and a $C_2$–$C_{20}$ aliphatic ester of a monoethylenically unsaturated mono- or di-carboxylic acid, or a copolymer of ethylene and vinyl acetate. The acrylic rubber may be supplied by compositions containing these terpolymers or copolymers. The preferred polyamides have a number average molecular weight of 2000–10000, a softening point of 90–150° C., and an amine equivalent of from 70–400 (amine equivalent being the number of milliequivalents of perchloric acid required to neutralize one kilogram of the polyamide). The polyamides are preferably based on dibasic acids, especially dimer acids, although small amounts of tribasic and higher acids, e.g. trimer acid, may be present it is preferred that they should not total more than 10% by weight of the acid component of the polyamide. Typical polyamides are condensation interpolymers of at least one diamine with one or more dibasic acids. The polyamides preferably have a glass transition temperature below 10° C., more preferably below 0° C. A liquid polyamide may be added as a further component.

Other types of hot-melt adhesives can be used in addition to those which can be reversibly softened and hardened, and within the term "hot-melt adhesive" we include thermosets, which can be reacted to soften and which then irreversibly cure. Whichever type of heat-activatable adhesive is used, it must provide a bond between the sleeve and the pipe insulation or casing, and in general it can be regarded as forming a second seal thus providing additional environmental protection. The excellent bond between the sleeve and the pipe insulation or casing that can be achieved by using such adhesive in conjunction with the mastic or other sealant provides the seal with considerable dimensional integrity. Thus, flexible seals can be constructed which can withstand considerable pressure, and can therefore be pressure tested to ensure perfect sealing.

The hot-melt adhesive can be coloured with a pigment to allow a clear indication when the adhesive has melted sufficiently to appear at the ends of the sleeve. It is envisaged that the sleeves of this invention will be usefull in conjunction with pre-insulated pipes having polyethylene jackets, as well as those having more readily bondable surfaces such as PVC. The polyamide and other formulations mentioned above are suitable for bonding to polyethylene, and excellent bonding is possible if the usual surface treatment is performed.

The sealant, as mentioned above, is preferably a mastic such as that described in U.S. Pat. No. 3,197,819. A preferred formulation is a blend of atactic polypropylene and polyisobuytylene, optionally with a tackifier, but other products will be acceptable. Since at room temperature most mastics are tacky the sleeve is preferably coated over at least the mastic region with a release paper. The mastic or other sealant, as a result of its flexibility, provides the sleeve with self-sealing and void filling properties and acts as an excellent barrier to water and to other environmental contaminants.

The size of the sleeve will be chosen to match the pipe to be protected. In general, we prefer the length of a wraparound sleeve to be from 120–220 mm greater than the circumference of the pipe jacket for jackets of diameter 150–260 mm. These figures should be used where a patch is used to hold the sleeve in the wrapped configuration. Where the closure means is by rail and channel, and where the sleeve is tubular, the circumference of the sleeve should be only slightly greater than that of the pipe jacket to allow some unresolved recovery to remain in the sleeve after heating.

It is preferred that the central sealant coating and the two outer hot-melt or other heat-activatable adhesive coatings run continuously the whole circumference of the sleeve. However, this is not necessary and the hot-melt adhesive could be applied intermittently along the length of the sleeve. It will of course generally be essential that the sealant coating be continuous so that the complete circumference of any pipe to be covered is protected. The two outer hot-melt adhesive coatings are preferably applied to the recoverable backing as such, but the whole of the backing may be coated with a layer of hot-melt adhesive, and a central region of sealant superimposed. In some circumstances a complete backing of hot-melt can act as a useful barrier, providing the sleeve with a double sealant layer.

The width of the sealant coating is clearly determined by the width of pipe to be protected, but the determination of a suitable width of the hot-melt adhesive and the uncoated slip-resisting region is more complex. Firstly these must be sufficient to match the forces which tend to slide the sleeve along the pipe, or which tend to force the ends of the sleeve away from the pipe or which tend to reduce the efficiency of the sleeve in other ways. The uncoated region enhances the slip resistance to a surprising extent, thus reducing the likelihood of "milk-off" slippage when sleeves are being shrunk in use over the diameter step between the casing and the adjacent pipe insulation under conditions which may soften the grip of the adhesive-coated regions.

The optimum thicknesses of the sealant and adhesive will now be considered. The minimum thickness of the adhesive will be governed by the amount necessary to form a good bond to the pipe, which will depend on the size and nature of the pipe jacket, and the maximum thickness will be governed by cost, installation time and prevention of excessive slipping of the sleeve due to the elastic band effect. Preferred thicknesses are from 0.4–2.0 mm, more preferably 0.5–0.9 mm. The thickness of the mastic should be sufficient to ensure proper sealing function against water or fluids and must allow proper filling of voids, step-downs and overlaps along the pipe insulation surface. Preferred thicknesses are from 0.8–2.0 mm, more preferably 1.0–1.5 mm. The thickness of each coating must be chosen with the other in mind, and it is important that the sealant is not so thick that it interferes with the bonding of the adhesive to the pipe.

The new sleeve will generally be produced by extrusion as a flat strip but tubular extrusion and cutting is an alternative. The cross-linking and expansion steps can be carried out as part of the same process. Similarly, the coating operation can be made part of the same production line. The precise coating technique will depend on whether the hot-melt adhesive is present as outer strips only (as is preferred) or is present as a complete coating superimposed by a narrower layer of sealant. The two coatings can be applied sequentially or simultaneously. Finally, a release paper can be applied to the sealant coating, and a temperature indicating paint can be applied to an uncoated surface of the recoverable material.

BRIEF DESCRIPTION OF THE DRAWINGS

The invention is now further illustrated by the accompanying drawings, in which:

FIG. 1 is a cross-section of a sleeve having a sealant and a hot-melt adhesive coating;

FIG. 2 is a plan-view of the sleeve of FIG. 1;

FIGS. 1 and 2 show a recoverable polymeric sheet material 1 (recovery ratio preferably 25–31%) of thickness about 1 mm coated with two strips 2 of hot-melt adhesive of width 40–50 mm, preferably about 45 mm, and thickness about 0.7 mm, and with a central coating of a mastic of width about 130 mm and thickness about 1.4 mm. An uncoated slip-resisting strip 4 according to the invention is shown between one of the adhesive strips 2 and the mastic 3. The total width of the sleeve is about 225 mm, and a section only of its length is shown in FIG. 2. The exposed surface of the mastic 3 thus constitutes the first region so called, and the exposed surfaces of the adhesive 2 constitute the second region so called. If desired, the adhesive 2 could extend across the width of the sleeve 1 underneath the mastic 3, the mastic then lying on top of the adhesive.

FIGS. 3–6 show the application of an embodiment of the invention to a joint in an insulated pipe. Such pipes are used in district heating systems, and joints will in general require moisture and environmental sealing, and also continuity of insulation. The invention is particularly useful in conjunction with district heating pipes having a steel transport pipe surrounded by polyurethane foam and a polyethylene jacket. Excellent results are however obtained with other transport pipes such as copper or cross-linked polyethylene, with other insulations such as glass wool, and with other outer jackets such as PVC or asbestos cement.

These figures show pipes 4 surrounded by insulation, here shown as polyurethane foam 7 and an outer jacket 5. In each of the figures two pipes are joined by a weld line 6, although other joining techniques could be used.

Figure 3:
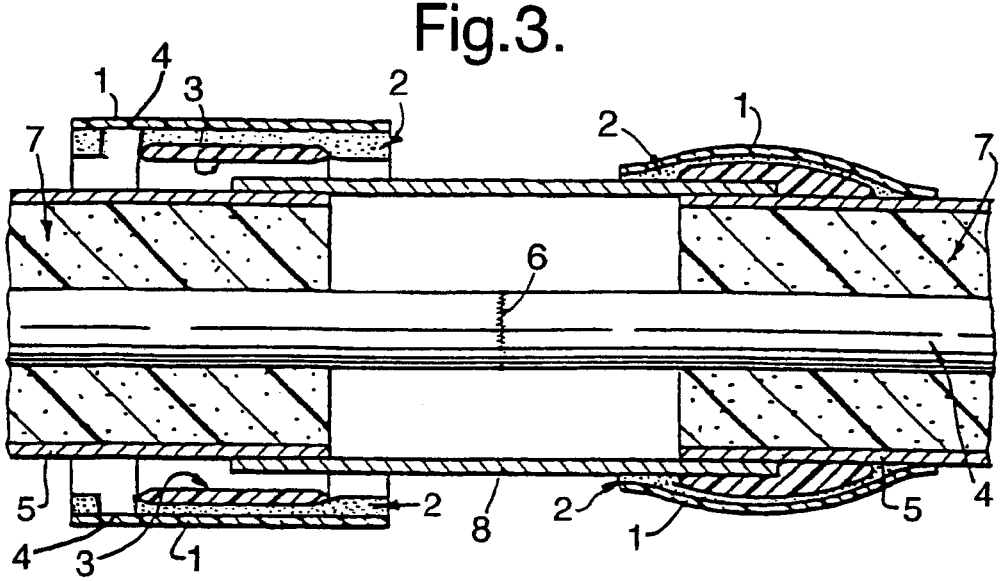
FIG. 3 shows a sleeve around a joint in an insulated pipe.

In FIG. 3 the exposed portions of pipe are surrounded by a casing 8. The ends of the casing 8 are joined to respective pipe insulations 7 and 5 by means of the sleeve of the invention. The left-hand side of FIG. 3 shows the sleeve in place around the pipe but before shrinkage and activation and softening of the coatings, and the right-hand side of the figure shows the finished installation. As in the earlier figures, the sleeve comprises a recoverable polymeric material 1 with a sealant coating 3, two hot-melt adhesive coatings 2 and an uncoated slip-resisting region 4. In this case, however, the hot-melt adhesive coating extends the width of the sleeve and underneath the sealant 3.

Figure 4:
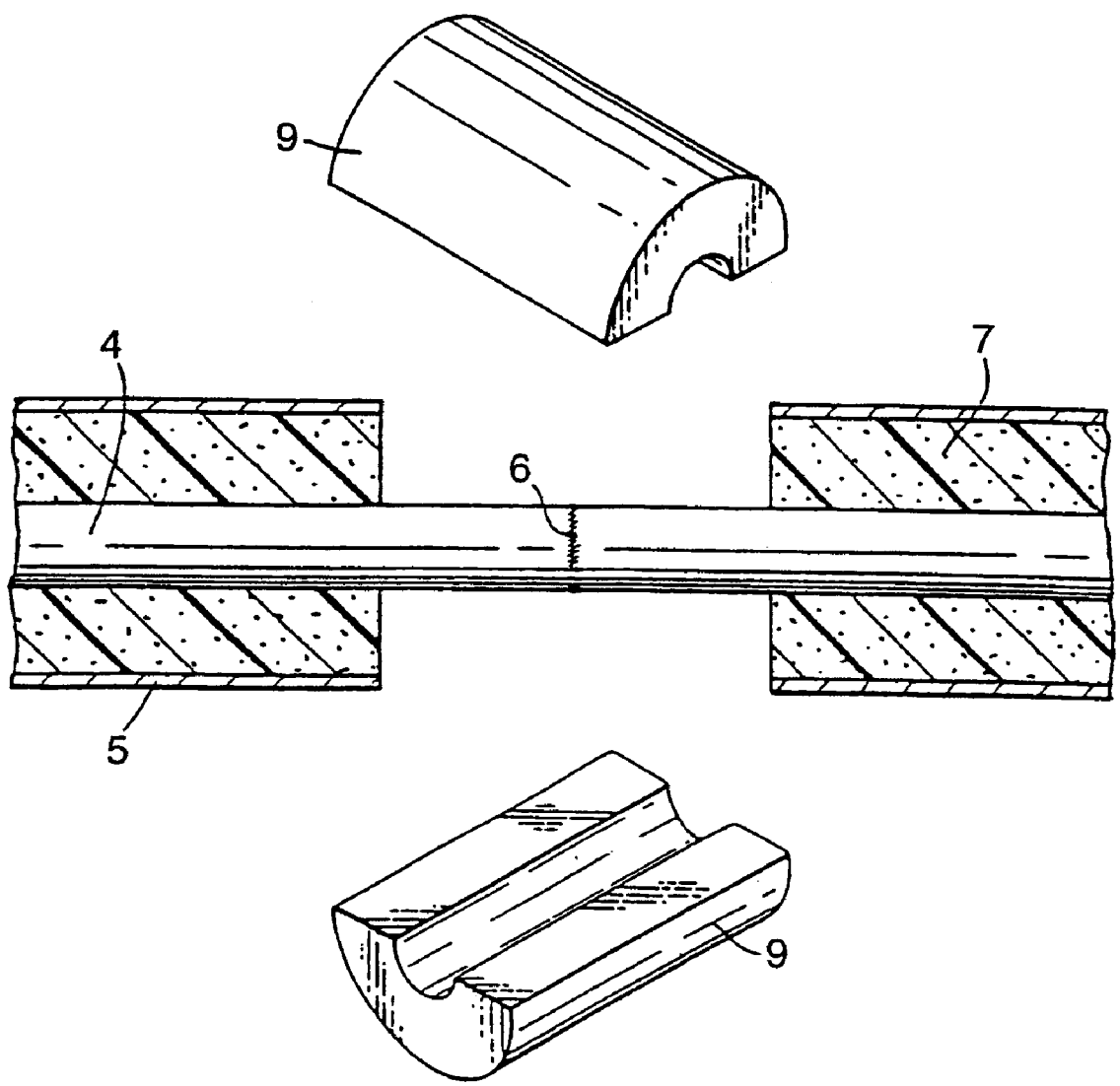
FIG. 4 shows one technique for insulating a joint region.

The casing of FIG. 3 is of sheet material and thus defines an annular space around the joined pipes, the ends of the annular space being defined by insulation 7 and 5 of each pipe. The casing may be tubular (requiring access to a free end pipe for installation) or may be wraparound. Various types of wraparound casing may be provided, such as separate half-shells, hinged half-shells, sheet which is simply wrapped around the joint and secured by closure means such as adhesive bond, a frame plus external sheet or tape wrapping, and multi-segmented casing. The situation illustrated in FIG. 4 is somewhat different. Here, the casing comprises two half-shells 9 of insulating material which are assembled around the exposed pipe ends to make good the pipe insulation that had to be removed (or omitted) in order to make the pipe joint. These half-shells may simply be blocks of foam or other insulating material or they may comprise more than one component, such as insulating material plus an outer jacket; in either case, the sleeve of the invention is applied to provide a seal across the joins between the casing and the existing pipe insulation, or from one pipe insulation to the other.

Figure 5:
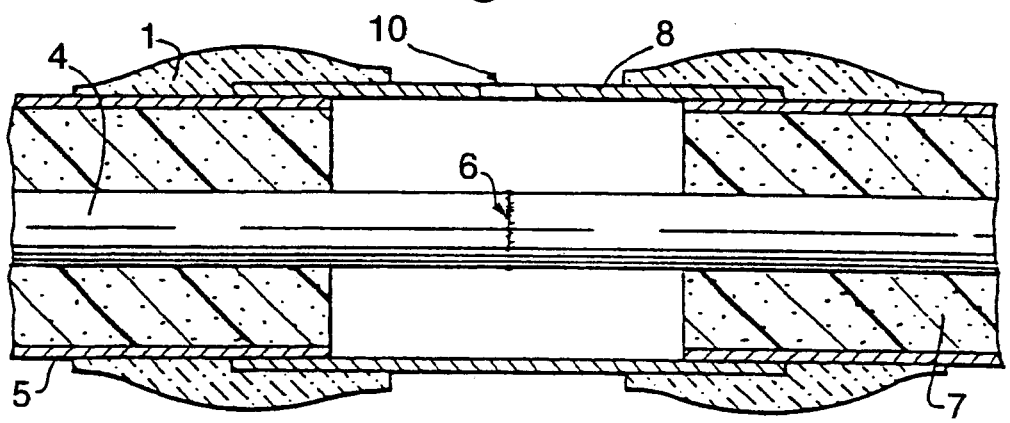
FIG. 5 shows a second technique for insulating a joint region.
Figure 6:
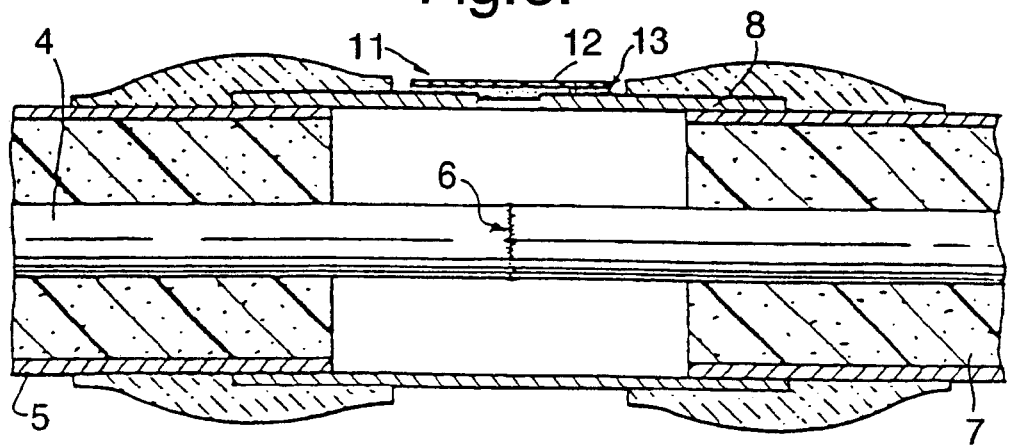
FIG. 6 a completed joint between two insulated pipes.

FIGS. 5 and 6 show a casing 8 of substantially sheet material, but with means for providing continuity of thermal insulation across the pipe joint. Where the invention is used on a district heating, or other high temperature pipe, a continuous heat insulation will clearly be desirable. On other pipes it may be sufficient to provide a continuous moisture or environmental seal. The means by which this continuity of thermal insulation may be provided is a hole 10 in the material of the casing 8. After the casing 8 has been installed around the joined pipes, and preferably after the sleeves 1 have been secured in place, an insulating material is introduced through the hole 10 to fill the annular space around the joined pipes. The insulating material is preferably a liquid which is poured through the hole 10 which then foams in situ. Polyurethane foam is preferred.

After the insulating material has been introduced (and where necessary after foaming is complete) the hole 10 is preferably stopped in order that the insulating material be protected against moisture. This can be done by providing a single sleeve 1 of sufficient width to extend from one pipe insulation 5 to the other, instead of the two separate sleeves 1 as illustrated. However, better results have been obtained by stopping the hole 10 with the closure means 11 as shown in FIG. 6. Closure means 11 comprises a polymeric backing sheet 12 and an adhesive coating 13. The backing sheet 12 is preferably a dimensionally stable cross-linked polyolefin and the adhesive 13 is preferably a hot melt or otherwise heat-activatable adhesive. The adhesives mentioned above as constituting the second region of the sleeve may also be used here. Where the adhesive is heat-activatable, the backing sheet 12 may be provided on its exposed surface with a temperature indicating composition (such as a paint which changes colour) to help the installer judge when sufficient heat has been applied to produce a satisfactory bond.

In general the closure means 11 will be circular or substantially square (having founded-off corners) and substantially smaller than the length of the casing 8. A typical size would be from 70–150 mm, more typically about 110 mm, in diameter when circular, and of comparable size when substantially square.

The closure means 11 may be used in conjunction with a plug of solid (rather than sheet) material. The plug may be retained, or may be used temporarily until the insulating material had set or finished foaming and then removed before application of the closure means 11. It may be preferred that the plug be removed where the completed joint is to have a highly uniform surface, and where earth movements are likely to damage it. However, in certain circumstances the plug may be left in place and the closure means 11 used for additional protection.

What is claimed is:

1. A method of sealing a joint (6) between two insulated pipes (14) the insulation (7) of each of which ends short of the joint, which comprises:
   (a) surrounding the exposed portions of pipe with a casing (8);
   (b) joining an end of the casing to the adjacent pipe insulation by installing around the end of the casing a sleeve comprising a recoverable polymeric material (1) wherein the sleeve is coated with a component selected from the group consisting of a sealant (3), a heat-activatable adhesive (2), and a mixture of a sealant and a heat-activatable adhesive, and
   (c) causing the polymeric material to recover, the sealant to soften and the heat-activatable adhesive to be activated, characterised in that at least one region (4) of the sleeve remains uncoated to provide a relatively high-friction slip-resisting grip when the sleeve is being recovered in use.

2. A method according to claim 1, wherein the sealant is positioned to overlap the end of the casing around substantially its entire periphery, and the heat-activatable adhesive is positioned to form substantially annular bonds between the sleeve and the casing and between the sleeve and the pipe insulation (5, 7).

3. A method according to claim 2, wherein the uncoated region, or one of them, is between the sealant-coated and the adhesive-coated segment.

4. A method according to claim 1 in which the casing comprises half-shells (9) of an insulating material, the thickness of the insulating material being substantially equal to the thickness of the pipe insulation.

5. A method according to claim 1 in which the casing is hollow such that installation of said casing defines an annular space around the joined pipes, the ends of the annular space being defined respectively by the insulation of each insulated pipe.

6. A method according to claim 5, which additionally comprises filling said annular space, after installation of the casing with an insulating material.

7. A method according to claim 6, in which the insulating material is a liquid which foams when in said annular space.

8. A method according to claim 6 in which the space is filled by pouring the insulating material into said annular space by means of a hole (10) in the casing.

9. A method according to claim 8, which additionally comprises covering the hole after introduction of said insulating material, by means (11) which comprise a polymeric backing sheet (12) coated with an adhesive (13) by means of which the backing material is bonded to the casing.

10. A method according to claim 9, in which the backing is coated with a heat-activatable adhesive on one major surface and a temperature indicating composition on an opposite surface, the closing means being installed by heating until the temperature indicating composition indicates activation of the adhesive.

11. A method according to claim 1 in which a separate said sleeve is installed around each end of the casing.

12. A method according to claim 1 in which the insulated pipe comprises a steel pipe, insulated by polyurethane foam (7) surrounded by a polyethylene jacket (5).

13. A sealed pipe joint prepared in accordance with claim 1.

14. An assembly for use in the sealing of a cavity around an uninsulated portion of a pipe which comprises:
   (a) a casing (8) arranged substantially to surround the uninsulated portion of a pipe; and
   (b) a sleeve comprising a recoverable polymeric sheet (1) wherein the sleeve has a layer of a heat-activatable adhesive (2) at a first region of a principle surface thereof, the layer of adhesive being arranged so as, in use, to provide a substantially annular bond between the polymeric sheet (1) and the insulation of the pipe (5) or the casing (8), which can resist movement of the sheet relative to the insulation;
   and a layer of a sealant (3) at a second region of the said principle surface, which sleeve can be arranged in use to overlap the casing and the pipe insulation, so as to provide on recovery of the polymeric sheet in us, a flexible seal between the casing and the insulation which can accommodate relative movement between the casing and the insulation, characterised in that at least one region (4) of the sleeve, remains uncoated to provide a relatively high-friction slip-resisting grip when the sleeve is being recovered in use.

15. An assembly according to claim 14, wherein the uncoated region, or one of them, is at the edge of the sleeve.

16. An assembly according to claim 14, wherein the uncoated region, or one of them, is between the sealant-coated and the adhesive-coated regions.

17. An assembly, according to claim 14, in which the sleeve has the heat-activatable adhesive at two regions of the said principle surface, the sealant being present between the two regions.

18. An assembly according to claim 14 in which the sealant is a mastic that comprises an atactic polypropylene and polyisobutylene.

19. An assembly according to claim 14 in which the heat-activatable adhesive is hot-melt adhesive comprising an EVA and a hydrocarbon wax, or a polyamide and a hydrocarbon wax, or a polyamide and up to 10% by weight of the polyamide of an acrylic rubber.

20. An assembly according to claim 14 in which the casing comprises half-shells (9) of an insulating material.

21. An assembly according to claim 14 in which the casing is hollow such that installation of said casing defines an annular space around the joint, an end of the space being defined by the end of the insulation (7) of the insulated pipe.

22. An assembly according to claim 21, which further comprises a foamable material.

23. An assembly according to claim 14 in which the sleeve is in the form of a roll, the first and second regions being strips running substantially continuously along the length of the roll.

24. An assembly according to claim 23 which further comprises a closure patch (11), comprising a polymeric sheet (12) coated with a heat-activatable adhesive (13).

* * * * *